(12) United States Patent
Lapp

(10) Patent No.: US 10,180,179 B2
(45) Date of Patent: Jan. 15, 2019

(54) CHAIN TENSION CONTROL MECHANISM

(71) Applicant: Schiller Grounds Care, Inc., Southampton, PA (US)

(72) Inventor: Jonathan Lapp, Johnson Creek, WI (US)

(73) Assignee: Schiller Grounds Care, Inc., Southampton, PA (US)

(*) Notice: Subject to any disclaimer, the term of this patent is extended or adjusted under 35 U.S.C. 154(b) by 189 days.

(21) Appl. No.: 15/412,880

(22) Filed: Jan. 23, 2017

(65) Prior Publication Data

US 2018/0209516 A1 Jul. 26, 2018

(51) Int. Cl.

| F16H 7/12 | (2006.01) |
| --- | --- |
| F16H 7/08 | (2006.01) |
| F16H 7/06 | (2006.01) |
| A01B 45/02 | (2006.01) |
| A01B 76/00 | (2006.01) |

(52) U.S. Cl.
CPC .............. *F16H 7/129* (2013.01); *F16H 7/06* (2013.01); *F16H 7/0848* (2013.01); *A01B 45/02* (2013.01); *A01B 76/00* (2013.01); *F16H 2007/0853* (2013.01); *F16H 2007/0865* (2013.01); *F16H 2007/0893* (2013.01)

(58) Field of Classification Search
CPC .......... F16H 7/129; F16H 7/06; F16H 7/0848; F16H 2007/0853; F16H 2007/0865; F16H 2007/0893; A01B 45/02; A01B 76/00
USPC .................................................. 474/133, 135
See application file for complete search history.

(56) References Cited

U.S. PATENT DOCUMENTS

| 1,423,172 A * | 7/1922 | Anderson ............... F16H 7/129 474/133 |
| --- | --- | --- |
| 1,778,334 A | 10/1930 | Pederson |
| 2,088,209 A | 7/1937 | Nolte |
| 2,206,264 A | 7/1940 | Rose |
| 2,234,534 A | 3/1941 | Reno |
| 2,302,944 A | 11/1942 | Helbig |
| 3,136,274 A | 6/1964 | Townsend |
| 3,357,422 A | 12/1967 | Creelman |
| 3,777,460 A | 12/1973 | Mokros |

(Continued)

OTHER PUBLICATIONS

Office Action dated Mar. 28, 2018 in U.S. Appl. No. 15/412,844, by Lapp.

*Primary Examiner* — Michael R Mansen
*Assistant Examiner* — Robert T Reese
(74) *Attorney, Agent, or Firm* — Panitch Schwarze Belisario & Nadel LLP

(57) ABSTRACT

A tension control mechanism includes a drive wheel and a jack wheel rotatably mounted with respect to a chassis of a self-propelled power tool. An idler arm is pivotally mounted to the chassis and carries an idler wheel. A flexible drive member entrains the drive wheel and the jack wheel and drives the idler wheel. First and second bias members bias the idler arm in opposing rotational directions, which move the idler wheel toward or away from the flexible drive member to respectively increase or decrease tension. A ratchet arm is attached to the idler arm has a hook. A ratchet head is fixed to the chassis and has ratchet teeth for engaging the hook to permit relative motion between the hook and the ratchet teeth to increase tension, and to limit relative motion between the hook and the ratchet teeth to prevent an excessive decrease in tension.

9 Claims, 3 Drawing Sheets

(56) References Cited

U.S. PATENT DOCUMENTS

| | | |
|---|---|---|
| 3,834,246 A | 9/1974 | McGilp |
| 3,986,562 A | 10/1976 | Killion |
| 4,336,760 A | 6/1982 | Cohen et al. |
| 4,750,565 A | 6/1988 | Hansen et al. |
| 4,753,298 A | 6/1988 | Hansen et al. |
| 4,867,244 A | 9/1989 | Cozine et al. |
| 5,398,769 A | 3/1995 | Staples |
| 5,509,487 A * | 4/1996 | Dufty .................... A01B 45/02 172/21 |
| 5,562,166 A | 10/1996 | Griffin |
| 5,569,106 A | 10/1996 | Splittstoesser et al. |
| 5,673,756 A | 10/1997 | Classen |
| 6,102,129 A | 8/2000 | Classen |
| 6,708,773 B1 | 3/2004 | Kinkead et al. |
| 6,758,283 B2 | 7/2004 | Lauer et al. |
| 7,472,759 B2 | 1/2009 | Petersen |
| 8,561,713 B2 | 10/2013 | De Bree |
| 8,733,477 B1 * | 5/2014 | Cook .................... A01D 34/824 172/42 |
| 8,925,643 B2 | 1/2015 | Georgoulias et al. |
| 9,686,898 B2 | 6/2017 | De Bree |
| 2004/0154811 A1 | 8/2004 | Kinkead et al. |
| 2004/0166975 A1 * | 8/2004 | Gibson .................. F16D 41/20 474/112 |
| 2004/0200625 A1 | 10/2004 | Petersen et al. |
| 2008/0196373 A1 | 8/2008 | Wilson et al. |
| 2009/0275431 A1 * | 11/2009 | Wigsten ................ F16H 7/0848 474/111 |
| 2015/0342109 A1 | 12/2015 | De Bree |

\* cited by examiner

CHAIN TENSION CONTROL MECHANISM

BACKGROUND OF THE INVENTION

The present invention relates generally to a tension control mechanism for a chain or other flexible drive member for a self-propelled power tool and, more particularly, to a tension control mechanism for a chain or other flexible drive member for a self-propelled aerator.

In the field of landscaping, turf aeration ("aeration") is the process of mechanically removing small plugs of soil from a lawn or other ground surface. Aeration is typically performed in a relatively limited portion of the year, spanning several weeks in the spring and several weeks in the fall. Because the aeration season is short, commercial landscapers need robust aeration equipment to maximize productivity.

Commercial landscapers commonly employ mechanical, self-propelled power aerators ("aerators") that allow an operator to ride or stand on the aerator. A typical aerator has tines, which are cutting members for removing plugs of soil during aeration. The tines are typically mounted on one or more rotating tine wheels. An aerator is typically powered by an internal-combustion engine that drives a chain operatively connected to propulsion wheels and the tine wheels.

One issue inherent in self-propelled aerators and other self-propelled power tools is the tendency for the chain or other flexible drive member to stretch, break, or otherwise need service, such as a manual tension adjustment. When a repair or service is needed, the resulting down time reduces productivity. Many existing aerators and other self-propelled power tools require frequent, manual, invasive service to adjust the tension in the chain or other flexible drive member. With respect to aerators, because it is difficult to predict when a chain tension adjustment is needed, the chain-and-sprocket systems of aerators are prone to failure due to failure to adjust the tension. In addition, the dynamics of the chain drive or other flexible drive member of a self-propelled power tool can cause vibrations and variations in tension, as well as variations in axle and shaft loads.

The presently preferred embodiment of the invention uses a spring-loaded tension mechanism to adjust to dynamic loading, wear, and break-in of chains and other flexible drive members and of sprockets, pulleys, and the like, without the need for manual service of the tension control mechanism. The tension control mechanism also provides for appropriate tension when the self-propelled power tool is driven in reverse. The presently preferred embodiment of the invention does not require the user or owner to have service performed in order to maintain proper tension. The presently preferred embodiment of the tension control mechanism maintains tension automatically and includes a ratchet that adjusts the tension to compensate for normal wear and break-in.

BRIEF SUMMARY OF THE INVENTION

Briefly stated, a tension control mechanism is provided for a flexible drive member for a self-propelled power tool. The self-propelled power tool has a chassis, a power source mounted on the chassis, and a propulsion wheel. The tension control mechanism comprises a drive wheel rotatably mounted with respect to the chassis and driven by the power source. A jack wheel is rotatably mounted with respect to the chassis and driven by the drive wheel and is operatively connected to the propulsion wheel. The tension control mechanism also comprises a flexible drive member operatively connecting with and entraining the drive wheel and the jack wheel, an idler arm pivotally mounted to the chassis, and an idler wheel rotatably mounted to the idler arm and driven by the flexible drive member. A first bias member is operatively connected with the idler arm and biases the idler arm in a first rotational direction so that the idler wheel tends to displace the flexible drive member to increase tension in the flexible drive member. A second bias member is operatively connected with the idler arm and biases the idler arm in a second rotational direction so that the idler wheel tends to displace the flexible drive member to decrease tension in the flexible drive member. The tension control mechanism also comprises a ratchet arm having a proximal end portion operatively attached to the idler arm and a distal end portion having a hook. The ratchet head is fixed to the chassis and has a plurality of ratchet teeth for engaging the hook of the ratchet arm. The hook and the ratchet teeth permit relative motion between the hook and the ratchet teeth in a first direction and limit relative motion between the hook and the ratchet teeth in a second direction. The relative motion in the first direction corresponds to movement of the idler arm in the first rotational direction, and the relative motion in the second direction corresponds to movement of the idler arm in the second rotational direction. The first bias member and the second bias member maintain tension in the flexible drive member within a predetermined operating range. The ratchet arm and the ratchet head cooperate with the first bias member and the second bias member to allow the idler arm to rotate in the first rotational direction to increase the tension in the flexible drive member and, once the idler arm has been rotated to increase the tension in the flexible drive member, to limit the rotation of the idler arm in the second rotational direction.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1:
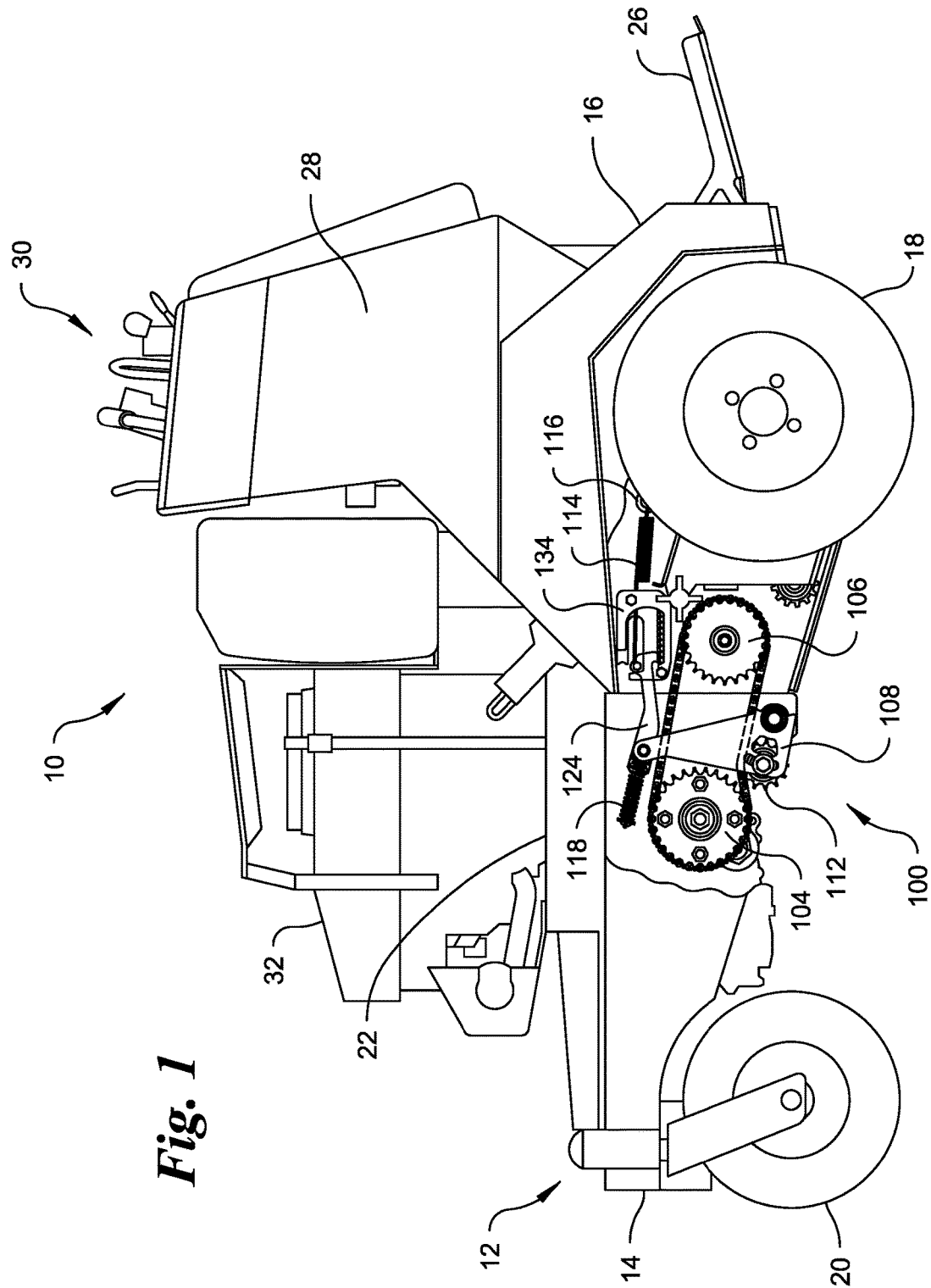
FIG. 1 is a right side elevational and partial cutaway view of a chain tension control mechanism mounted on a stand-on aerator in accordance with a preferred embodiment of the present invention.

Certain terminology is used in the following description for convenience only and is not limiting. Unless specifically set forth herein, the terms "a", "an" and "the" are not limited to one element but instead should be read as meaning "at least one". The words "right", "left", "lower" and "upper" designate directions in the drawings to which reference is made. The words "inwardly" or "distally" and "outwardly" or "proximally" refer to directions toward and away from, respectively, the geometric center of the device and related parts thereof. The terminology includes the above-listed words, derivatives thereof and words of similar import.

It should also be understood that the terms "about," "approximately," "generally," "substantially" and like terms, used herein when referring to a dimension or characteristic of a component of the preferred invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2:
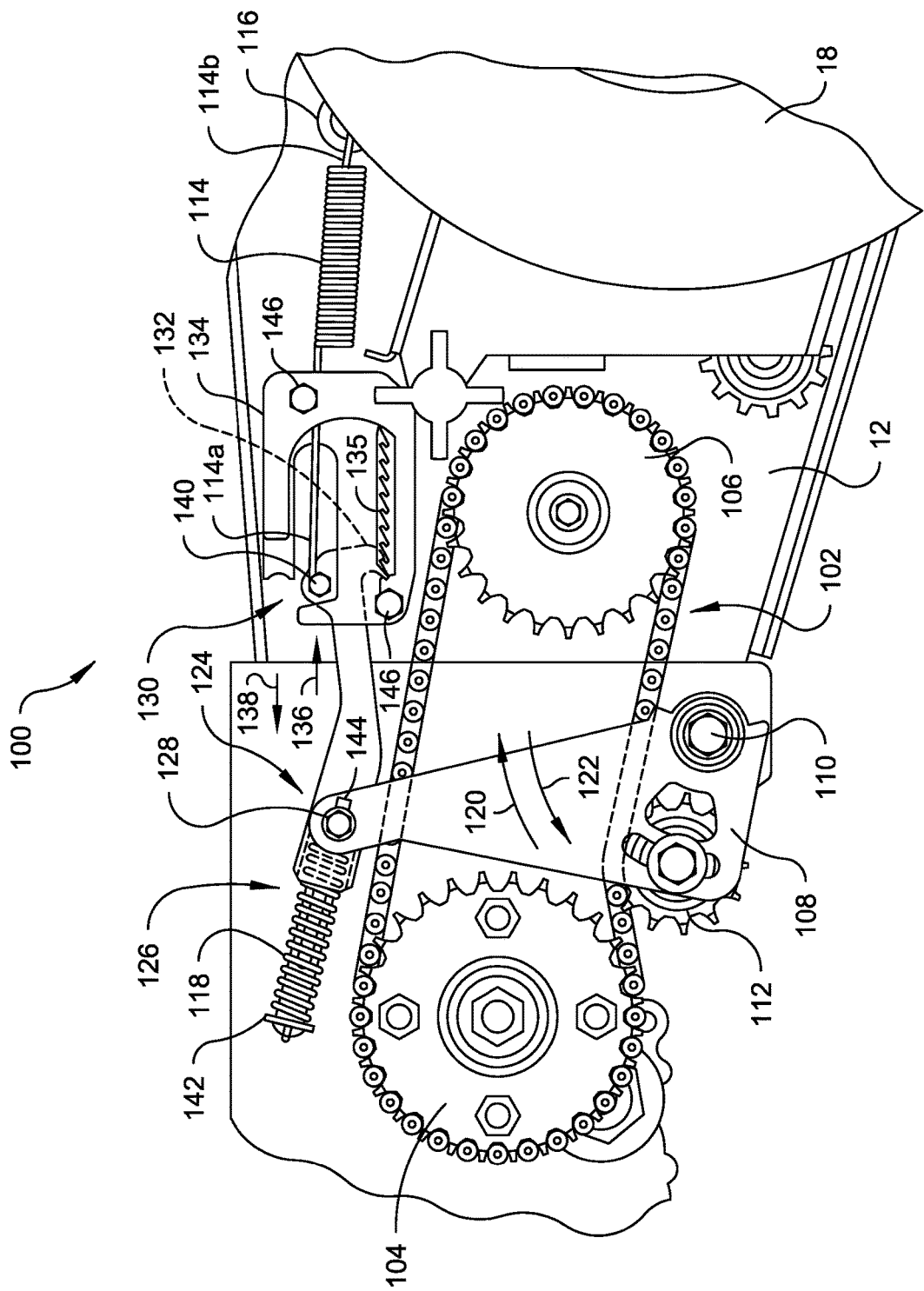
FIG. 2 is an enlarged right side elevational view of the chain tension control mechanism of FIG. 1.

Referring to FIGS. 1-2, a preferred embodiment of the present invention is directed to a tension control mechanism 100 for a self-propelled power tool, which in the exemplary embodiment is an aerator 10. The tension control mechanism 100 according to a preferred embodiment of the invention is particularly advantageous when incorporated into to the self-propelled aerator 10; however, the tension control mechanism 100 may be used with other self-propelled tools and machines and is not limited to the aerator 10.

The aerator 10 includes a chassis 12 having a forward end 14 and a rearward end 16. The chassis 12 preferably has two propulsion wheels 18 (only one is shown) mounted near the rearward end 16 and two driven wheels 20 (only one is shown) mounted near the forward end 14 of the chassis 12. In alternative embodiments, the chassis 12 could include additional propulsion wheels 18 or additional driven wheels 20, or the chassis 12 could alternatively include only a single propulsion wheel 18 or a single driven wheel 20. In a preferred embodiment shown in FIGS. 1-2, the propulsion wheels 18 and the driven wheels 20 engage the ground (not shown) or other support surface to provide stability to the chassis 12. The chassis 12 includes an engine deck 22 supporting a power source, which is preferably an internal-combustion engine 32. In alternative embodiments, the engine 32 may be replaced by an electric motor, or by any other form of power source suited to the performance constraints of the aerator 10. The engine 32 supplies rotational energy to tine wheels 82 (see FIG. 3) and the propulsion wheels 18. The chassis 12 preferably includes a platform 26 for a standing user (not shown) and a control tower 28 supporting a control panel 30 allowing the user to operate the aerator 10.

Figure 3:
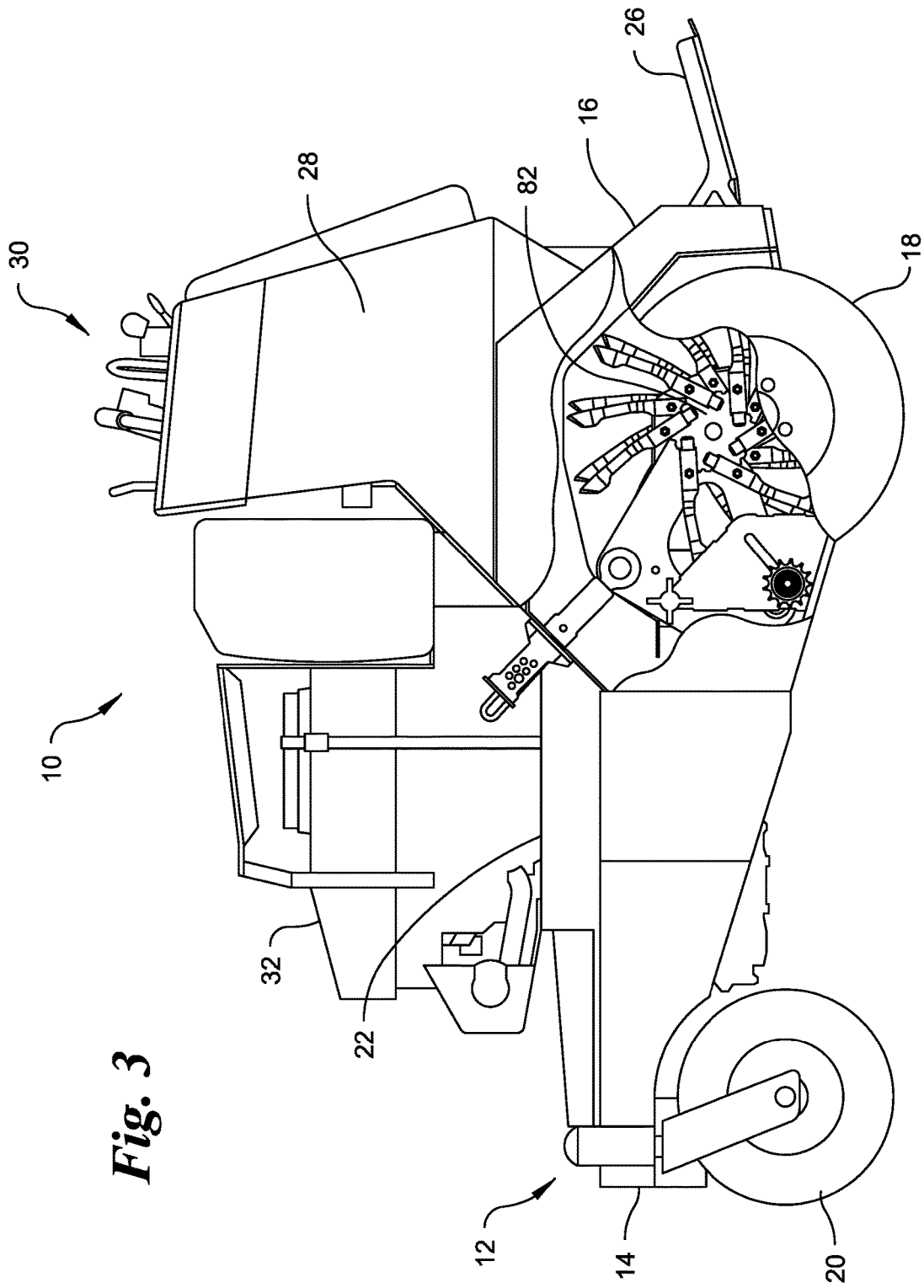
FIG. 3 is a right side elevational and partial cutaway view of a tine wheel mounted on the aerator of FIGS. 1-2.

Referring to FIGS. 1-2, the aerator 10 includes, on each side of the chassis 12 forward of the respective propulsion wheel 18, a tension control mechanism 100 according to an exemplary embodiment of the present invention. The tension control mechanism 100 controls the tension in a flexible drive member, which in FIGS. 1-2 is a chain 102. Alternatively, the flexible drive member could take the form of a cable, a band, or another flexible, tension-transmitting element. The tension control mechanism 100 includes a drive wheel, which takes the form of a drive sprocket 104. The drive sprocket 104 is rotatably mounted with respect to the chassis 12 and driven by the engine 32, preferably via a hydrostatic transmission (not shown). A jack sprocket 106 serves as a jack wheel and is rotatably mounted with respect to the chassis 12. The jack sprocket 106 is preferably operatively connected to the propulsion wheel 18 on the same side of the chassis 12 and, in the embodiment of FIGS. 1-3, is operatively connected to a plurality of tine wheels 82 (only one is shown) by additional sprockets and chains (not shown). The chain 102 operatively connects with and entrains the drive sprocket 104 and the jack sprocket 106.

The tension control mechanism 100 also includes an idler arm 108 pivotally mounted to the chassis 12 via a bolt 110. An idler sprocket 112 serves as an idler wheel and is rotatably mounted to the idler arm 108 and driven by the chain 102. Note that in an alternative embodiment in which the chain 102 is replaced by another flexible drive member such as a cable or band, the drive sprocket 104, the jack sprocket 106, and the idler sprocket 112 may preferably be replaced by pulleys or other rotatable members compatible with the particular type of flexible drive member being used.

The tension control mechanism 100 also includes a first spring 114, which serves as a first bias member and is operatively connected with the idler arm 108. The first spring 114 biases the idler arm 108 in a first rotational direction 120 such that the idler sprocket 112 tends to displace the chain 102 to increase tension in the chain 102. The first spring 114 has a first end 114a connected to the distal end portion 130 of a ratchet arm 124 and a second end 114b connected to the chassis 12 by an eye hook 116. A second spring 118, which serves as a second bias member, is operatively connected with the idler arm 108 and is connected to the chassis 12 by a spring anchor 142, which may be an eye hook, a bolt, or another suitable anchor. The second spring 118 biases the idler arm 108 in a second rotational direction 122 so that the idler sprocket 112 tends to displace the chain 102 to decrease tension in the chain 102. Although the first spring 114 and the second spring 118 are depicted as metal coil springs, the most common bias members for use in the tension control mechanism 100, other devices capable of generating a restorative force in response to a deflection—for example, elastic metal strips, cords, air springs, torsion springs, and other similar devices—may serve as the first bias member or the second bias member.

The tension control mechanism 100 also includes a ratchet arm 124 having a proximal end portion 126 and a distal end portion 130. The proximal end portion 126 is operatively attached to the idler arm 108, and the distal end portion 130 has a hook 132. The proximal end portion 126 of the ratchet arm 124 is pivotally connected to the idler arm 108, preferably by a pin 128. The pin 128 preferably passes through a hole or slot (not shown) in the idler arm 108 and a slot 144 or hole in the ratchet arm 124 to pivotally connect the idler arm 108 to the ratchet arm 124. The pin 128 is preferably fitted to the hole or the slot in at least one of the idler arm 108 and the ratchet arm 124 so as to allow some translational motion or "float" between the idler arm 108 and the ratchet arm 124, in addition to the pivotal motion provided by the pin 128 or other pivotal connection between the ratchet arm 108 and the idler arm 124. The translational motion or "float" between the idler arm 108 and the ratchet arm 124 preferably allows motion over a distance of about 0.7 inch.

The tension control mechanism 100 also includes a ratchet head 134 fixed to the chassis 12 by two bolts 146. Alternatively, the ratchet head 134 may be attached to the chassis 12 by any other suitable means. The ratchet head 134 has a plurality of ratchet teeth 135 for engaging the hook 132 of the ratchet arm 124. The hook 132 and the ratchet teeth 135 permit relative motion between the hook 132 and the ratchet teeth 135 in a first direction 136 and limit relative motion between the hook 132 and the ratchet teeth 135 in a second direction 138. The relative motion between the hook 132 and the ratchet teeth 135 in the first direction 136 corresponds to movement of the idler arm 108 in the first rotational direction 120, which increases tension in the chain 102. The relative motion between the hook 132 and the ratchet teeth 135 in the second direction 138 corresponds to movement of the idler arm 108 in the second rotational direction 122, which decreases tension in the chain 102. The first spring 114 and the second spring 118 are biased to maintain the tension in the chain 102 within a predetermined operating range. The ratchet arm 124 and the ratchet head 134 cooperate with the first spring 114 and the second spring 118 to allow the idler arm 108 to rotate in the first rotational direction 120 to increase the tension in the flexible chain 102 and, once the idler arm 108 has been rotated in the first rotational direction 120, to limit rotation of the idler arm 108 in the second rotational direction 122. Thus, through cooperation of the hook 132, the ratchet teeth 135, the first spring 114, and the second spring 118, the tension control mechanism 100 maintains tension in the chain 102 by preventing an excessive movement of the idler arm 108 in the second rotational direction 122. As a result, the tension control mechanism 100 maintains the tension in the chain 102 within the operating range upon wear or break-in of the chain 102, as well as in response to dynamic loading of the chain 102, including dynamic loading when the aerator 10 is driven in reverse.

It will be appreciated by those skilled in the art that changes could be made to the embodiment described above without departing from the broad inventive concept thereof. It is understood, therefore, that this invention is not limited to the particular embodiments disclosed, but it is intended to cover modifications within the spirit and scope of the present invention as defined by the present disclosure.

I claim:

1. A tension control mechanism for a flexible drive member for a self-propelled power tool having a chassis, a power source mounted on the chassis, and a propulsion wheel comprising:
   a drive wheel rotatably mounted with respect to the chassis and driven by the power source;
   a jack wheel rotatably mounted with respect to the chassis and driven by the drive wheel, the jack wheel being operatively connected to the propulsion wheel;
   a flexible drive member operatively connecting with and entraining the drive wheel and the jack wheel;
   an idler arm pivotally mounted to the chassis;
   an idler wheel rotatably mounted to the idler arm and driven by the flexible drive member;
   a first bias member operatively connected with the idler arm and biasing the idler arm in a first rotational direction so that the idler wheel tends to displace the flexible drive member to increase tension in the flexible drive member;
   a second bias member operatively connected with the idler arm and biasing the idler arm in a second rotational direction so that the idler wheel tends to displace the flexible drive member to decrease tension in the flexible drive member;
   a ratchet arm having a proximal end portion and a distal end portion, the proximal end portion being operatively attached to the idler arm, and the distal end portion having a hook;
   a ratchet head fixed to the chassis, the ratchet head having a plurality of ratchet teeth for engaging the hook of the ratchet arm;
   wherein the hook and the ratchet teeth permit relative motion between the hook and the ratchet teeth in a first direction and limit relative motion between the hook and the ratchet teeth in a second direction, the relative motion in the first direction corresponding to movement of the idler arm in the first rotational direction, and the relative motion in the second direction corresponding to movement of the idler arm in the second rotational direction; and
   wherein the first bias member and the second bias member maintain the tension in the flexible drive member within a predetermined operating range, and the ratchet arm and the ratchet head cooperate with the first bias member and the second bias member to allow the idler arm to rotate in the first rotational direction to increase the tension in the flexible drive member and, once the idler arm has been rotated to increase the tension in the flexible drive member, to limit the rotation of the idler arm in the second rotational direction.

2. The tension control mechanism of claim 1, wherein the proximal end portion of the ratchet arm is pivotally connected to the idler arm.

3. The tension control mechanism of claim 2, wherein the pivotal connection between the ratchet arm and the idler arm allows for translational motion between the ratchet arm and the idler arm.

4. The tension control mechanism of claim 1, wherein the first bias member is a spring.

5. The tension control mechanism of claim 4, wherein the second bias member is a spring.

6. The tension control mechanism of claim 1, wherein the hook, the ratchet teeth, the first bias member, and the second bias member cooperate to maintain the tension in the flexible drive member within the operating range upon wear of the flexible drive member.

7. The tension control mechanism of claim 1, wherein each of the drive wheel, the jack wheel, and the idler wheel comprises a sprocket, and the flexible drive element is a chain.

8. The tension control mechanism of claim 3, wherein the pivotal connection between the ratchet arm and the idler arm allows for translational motion over a distance of about 0.7 inch.

9. The tension control mechanism of claim 2, wherein the pivotal connection between the ratchet arm and the idler arm is a pinned connection comprising a pin and a slot providing a quantum of free translational movement of the pin within the slot.

* * * * *